United States Patent
Blondel et al.

(10) Patent No.: US 6,697,545 B2
(45) Date of Patent: Feb. 24, 2004

(54) METHOD FOR MONITORING AN OPTICAL WAVEGUIDE, AS WELL AS MONITORING SYSTEM AND MONITORING UNIT FOR SAID METHOD

(75) Inventors: Jean-Pierre Blondel, Buc (FR); Eric Brandon, Bourg la Reine (FR); Patrice Le Roux, Villebon sur Yvette (FR); Denis Toullier, Fleury les Aubrais (FR)

(73) Assignee: Alcatel, Paris (FR)

( * ) Notice: Subject to any disclaimer, the term of this patent is extended or adjusted under 35 U.S.C. 154(b) by 181 days.

(21) Appl. No.: 09/956,921

(22) Filed: Sep. 21, 2001

(65) Prior Publication Data

US 2002/0036767 A1 Mar. 28, 2002

(30) Foreign Application Priority Data

Sep. 22, 2000 (EP) .......................... 00 440 249

(51) Int. Cl.⁷ ................................. G20B 6/42
(52) U.S. Cl. ........................................ 385/15
(58) Field of Search ...................... 385/15, 17, 23, 385/24, 28, 31, 39, 42, 47, 50, 73, 49, 130, 14, 88, 90, 89; 359/127, 124, 128, 341

(56) References Cited

U.S. PATENT DOCUMENTS

| 5,251,001 A | 10/1993 | Dave et al. |
| 5,479,547 A | * 12/1995 | Kunikane et al. ............. 385/47 |
| 5,504,617 A | 4/1996 | Spirit |
| 5,555,127 A | * 9/1996 | Abdelkader et al. ........ 359/341 |
| 5,579,154 A | * 11/1996 | Mueller-Fiedler et al. .. 359/341 |
| 5,724,149 A | 3/1998 | Stallard et al. |

FOREIGN PATENT DOCUMENTS

| EP | 0 823 621 A2 | 2/1998 |
| EP | 0 954 125 A2 | 11/1999 |
| WO | WO 97/05713 | 2/1997 |

* cited by examiner

*Primary Examiner*—Jean F. Duverne
(74) *Attorney, Agent, or Firm*—Sughrue Mion, PLLC

(57) ABSTRACT

The invention concerns a method for monitoring an optical waveguide between a monitoring terminal point and a monitoring unit, in which an optical data signal from a transmitter, and for amplification, pump light from a pump laser, is emitted into the optical waveguide, wherein a monitoring signal transmitted by the monitoring unit is returned via the same waveguide to the monitoring unit by a reflection device located at the monitoring terminal point, in particular a Bragg grating placed in the optical waveguide, and wherein the reflection device is tuned to a reflection that is exactly the wavelength of the monitoring signal, as well as a monitoring system and a monitoring unit for said Method.

11 Claims, 1 Drawing Sheet

METHOD FOR MONITORING AN OPTICAL WAVEGUIDE, AS WELL AS MONITORING SYSTEM AND MONITORING UNIT FOR SAID METHOD

BACKGROUND OF THE INVENTION

The invention is based on a priority application EP 00440249.1, which is hereby incorporated by reference.

The invention is related to a method for monitoring an optical waveguide between a monitoring terminal point and a monitoring unit, in which an optical data signal from a transmitter, and for amplification, pump light from a pump laser, is emitted into the optical waveguide.

In modern optical transmission systems, optical waveguides are being increasingly employed over long routes without opto-electrical conversion and intermediate electrical amplification of the transmitted data signal. In that case the only active system components are optical amplifiers which compensate only the attenuation of the optical waveguide. For example, these optical amplifiers can be realised by means of erbium-doped fibre amplifiers or EDFAs in which the amplification is achieved by stimulated emission when the incident light passes through the amplifying medium. Because of a continuous supply of energy, this emission occurs in the form of higher-energy light, that is to say light that is of a shorter wavelength compared to the data signal; this Method is referred to as "optical pumping". Here the so-called pump light that is produced by a so-called pump laser can be fed to the amplifier via a separate optical waveguide or via the same optical waveguide that is also carrying the data signal. In this case the pump laser can be placed a few kilometers away from the amplifier, which is located at a point under water, for example. As an alternative to a fibre amplifier, amplification can be achieved by means of the so-called Raman effect, in which amplification is effected by controlled, stimulated scatter in the optical waveguide. For this, pump light is also generated by means of a pump laser, which, however, unlike in the case of the fibre amplifier, is not specifically fed to an optical amplifier, but where the amplification of the data signal is achieved in the optical waveguide itself.

In this case the pumping power of the so-called pump laser can amount to a few watts. Due to the very small diameter of the optical waveguide, this means an enormous concentration of light energy which, if it enters the human eye can cause irreparable damage to eyesight. For safety reasons, in the case of fracture of the optical waveguide, for example damage due to civil engineering works, care must therefore be taken to minimise the risk of personal injury. To this end, a fracture in the optical waveguide in hazardous areas should be reliably detected so that the corresponding pump laser can be immediately shut down.

A known accepted possible solution for detecting a fracture in an optical waveguide consists in installing an optical splitter, constructed as a so-called taper for example, at a specific point in the optical waveguide, via which a small portion of the light energy supplied by the pump laser can be tapped off and fed back to the pump laser via a further dedicated optical waveguide. Despite the supply of light energy, as soon as no energy is fed back a break in the optical waveguide is assumed to have occurred anywhere between the specific point and the pump laser and the pump laser is immediately shut down. However, the implementation of this solution has the disadvantage that, compared to an unmonitored transmission system, an additional optical waveguide is required.

SUMMARY OF THE INVENTION

In the following text it is always assumed that the pump laser serves at the same time as the monitoring unit, that is to say the detection of a break in the optical waveguide detects a specific section and effects the shut-down of the pump light. In principle, however, these functions can also be separated, whereby for example, the monitoring unit handles the monitoring of a specific laser path and on detection of a break transmits a shut-down signal to the corresponding pump laser.

The basic idea of the invention is that a monitoring signal emitted or transmitted by a pump laser to the optical waveguide is sent back to the pump laser via the same optical waveguide. To do this, at the point up to which the optical waveguide is to be monitored, in this case also referred to as the monitoring terminal point, a reflection device, for example a so-called Bragg grating, that reflects light energy of a specific wavelength, is placed in the optical waveguide. In addition to the pump light, the pump laser transmits a monitoring signal at this specific wavelength, which differs both from the wavelength of the data signal and from the wavelength of the pump light. As long as the optical waveguide is optically conducting between the pump laser, the pump laser receives the reflected monitoring signal. As soon as there is a break in the optical waveguide, the monitoring signal is usually no longer reflected and the pump laser stops emitting the pump light.

An advantageous development of the invention consists in the pump laser 2 sending out different monitoring signals, of which only the first monitoring signal is reflected at the Bragg grating. In the rare case of a planar cleave this can actually result in total reflection of the signals transmitted by the pump laser. The following different conclusions can be arrived at in the pump laser: if no monitoring signals or both monitoring signals are reflected, then it is concluded that there is a break in the optical waveguide and the pump laser is shut down. If only the first monitoring signal is reflected, then it is assumed that the optical waveguide is intact.

A further advantageous development consists in placing two or more different reflection devices, which reflect different wavelengths, at different points of the optical waveguide. The pump laser emits two or more monitoring signals at different wavelengths, one monitoring signal being reflected at one reflection device, respectively. In the event of a break in the optical waveguide at a specific point, all the monitoring signals whose reflection devices are located after the break are no longer reflected. By evaluating the received monitoring signals, the fracture point can then be accurately located section-by-section.

Further developments of the invention are disclosed in the dependent Claims and in the following description.

BRIEF DESCRIPTION OF THE DRAWINGS

The invention is explained in more detail with the aid of the attached drawings, of which:

FIG. 1 shows an optical transmission system with an (optical) transmitter 1, an (optical) splitter 2, a pump laser 3 and an (optical) receiver 4. The pump laser 3 has a line port 31, a terminal port 32 and a control port 33. The transmitter 1 is connected to the line port 31 of the pump laser 3 by means of an optical waveguide via the splitter 2. An additional optical waveguide runs from the splitter 2 to the control port 33 of the pump laser 3. The terminal port 32 of the pump laser 3 is connected to the receiver 4. A data signal 10 from the transmitter 1 passes along the optical waveguide via the splitter 2 and via the pump laser 3 to the receiver 4. The pump laser 3 emits pump light 20 from the line port 31 towards the transmitter 1 and a monitoring signal 21 passes from the splitter 2 via the additional optical waveguide back to the control port 33 of the pump laser 3.

Figure 1:
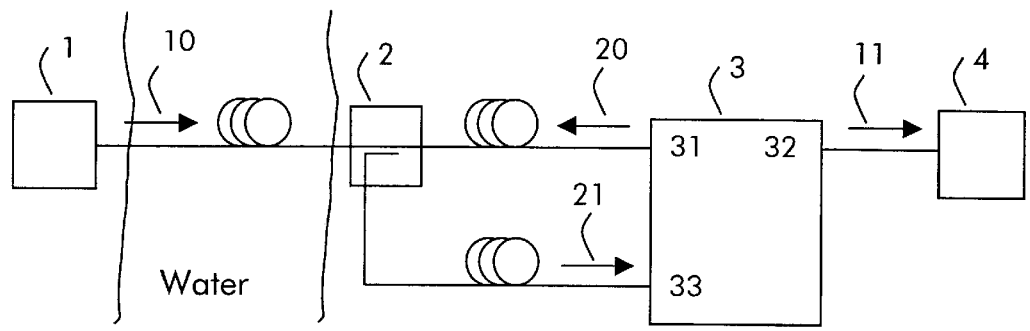
FIG. 1 shows an arrangement of an optical transmission system with a monitoring device according to the accepted prior art.

In this case it is assumed, for example that the distance from the transmitter 1 to the splitter 2, as well as the distance from the splitter 2 to the pump laser 3 is relatively long, for example 50 km or more, the route of the optical waveguide from the transmitter 1 to the splitter 2 representing a path running under water which is not hazardous to personnel, while the route from the splitter 2 to the pump laser 3 represents the optical waveguide routed over land which in the event of damage, caused by civil engineering works for example, is hazardous to personnel. It is assumed in this case that the pump laser 3 and the receiver 4 are arranged close together and this section is therefore not taken into further consideration here.

When an optical signal is transmitted over a long distance via an optical waveguide, deformation of the optical signal pulse occurs as a result of dispersion and attenuation effects as the transmission path increases. Usually, the optical signal therefore has to be regenerated at specific distances. If for attenuation compensation only amplification of the signal takes place, then this is referred to as 1-R regeneration. If for dispersion compensation the optical signal is additionally reshaped and re-synchronised, then this is also referred to as 3-R regeneration. While today the amplification of the optical signal is purely optical, purely optical 3-R regeneration is still not possible, at least in commercial systems. Dispersion can of course be countered by a so-called soliton transmission in which the light pulses are transmitted with a soliton pulse waveform, which do not change their shape over long routes. Without restricting the invention, it is to be assumed here that only one optical amplification occurs, where, as described at the outset, the amplification can be effected by a fibre amplifier, for example an erbium fibre amplifier or by Raman amplification in the optical waveguide itself. The fibre amplifier can for example be located under water between the transmitter 1 and the splitter 2. In both cases the feed for the amplification is effected by the pump laser 3 that generates high-energy pump light 20. For monitoring the optical waveguide path between the splitter 2 and the pump laser 3, the pump light 20 is tapped off at the splitter 2 and a small portion fed back as the monitoring signal 21 to the pump laser 3 via the additional optical waveguide. In the pump laser 3 a decision logic circuit checks whether a corresponding monitoring signal 21 returns when the pump light 20 is emitted. In the case where no corresponding monitoring signal 21 is received, the pump laser ceases the emission of the pump light 20. In this case it is highly probable that the optical waveguide is broken between the splitter 2 and the pump laser 3. Consequently there is no longer any danger to any personnel located at the point of fracture. The disadvantage of this arrangement compared to an unmonitored optical waveguide is that in order to feed back the monitoring signal 21, an additional optical waveguide has to be laid from the splitter 2 to the pump laser 3.

Figure 2:
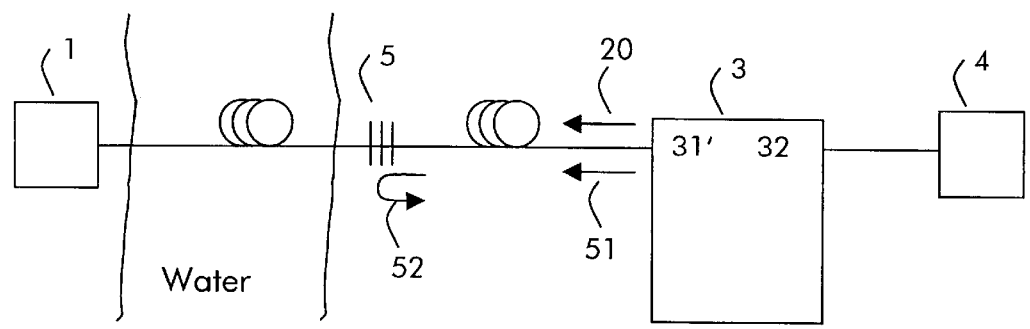
FIG. 2 shows an arrangement of an optical transmission system with a monitoring device according to the invention.

FIG. 2 now shows an arrangement with a Method for fracture detection according to the invention, which dispenses with the aforesaid additional optical waveguide.

Like FIG. 1, FIG. 2 shows the transmitter 1, the pump laser 3 and the receiver 4. Instead of the splitter 2, a Bragg grating 5 is installed at the same point. The pump laser 3 has a modified line port 31' and a terminal port 32. The transmitter 1 is connected via the Bragg grating 5 to the modified line port 31' by means of the optical waveguide shown in FIG. 1. The terminal port 32 of the pump laser 3 is connected to the receiver 4. As in FIG. 1, the pump laser 3 sends pump light 20 from the modified line port 31' towards the transmitter 1. Additionally from this port a monitoring signal 51 is transmitted to the transmitter 1, which is reflected at the Bragg grating 5 and returns as the reflected monitoring signal 52 via the optical waveguide to the modified line port 31' of the pump laser 3.

Bragg gratings that are located in the optical waveguide itself are preferably used today to obtain a reflection device 5 for reflecting light of a specific wavelength 51. Other options for producing such a type of reflection device are also conceivable, in which a signal is first tapped off by means of a splitter, for example, then filtered and finally again injected into the optical waveguide. In order to produce a Bragg grating in an optical waveguide, periodic non-uniformities which cause modulation of the fibre core's refractive index are produced in the doped fibre core in the longitudinal direction of the optical waveguide by irradiation with ultraviolet light. The selectivity of the Bragg grating increases proportionally with the length of the grating; that is to say the reflection spectrum around the reflected wavelength is more sharply developed with increasing grating length. Present-day methods allow the production of Bragg gratings with virtually complete reflection.

Parallel to the pump light 20, the pump laser 3 sends a monitoring signal 51 into the optical waveguide, this monitoring signal having a homogenous wavelength which causes reflection of the monitoring signal 51 at the Bragg grating 5, and results in the largest part of the monitoring signal 52 being fed back to the pump laser 3 as the reflected monitoring signal 52, as long as the optical waveguide between the Bragg grating 5 and the pump laser 3 is optically conducting. As soon as a break occurs in the optical waveguide, the monitoring signal 51 can no longer be reflected by the reflection device 5 to the pump laser 3; the pump laser 3 then immediately shuts down the pump light 20.

An advantageous development of the invention consists in the pump laser 3 sending a further monitoring signal which, compared to the monitoring signal 51 described in the preceding section, has a different wavelength and consequently is not reflected at the Bragg grating 5 and is thus not normally received at the pump laser 3. In the rare case of a planar cleave, however, this can result in total reflection of all emitted monitoring signal at the point of fracture. Such total reflection would not be detected by the Method described in the previous section. With total reflection, both monitoring signals are now reflected back to the pump laser 3 and classifies this case as an additional defect in the optical waveguide and, like the case where neither of the two monitoring signals is reflected, ends the emission of the pump light 20.

Figure 3:
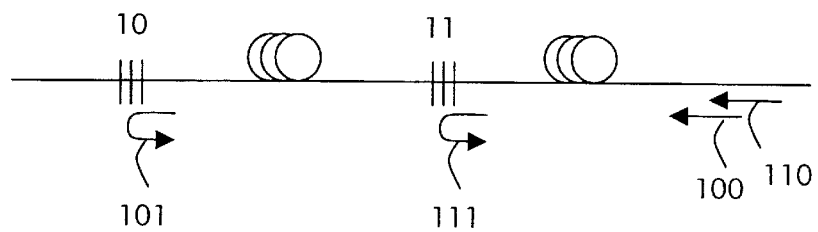
FIG. 3 shows schematically a development of the monitoring device according to the invention shown in FIG. 2.

FIG. 3 shows schematically a further advantageous development of the invention which facilitates a more accurate, section-by-section location of the fracture point. The optical waveguide illustrated here represents a section of FIG. 2 between the pump laser 3 and the transmitter 1. A first Bragg grating 10 and a second Bragg grating 11, respectively, is placed at two different points in the optical waveguide. A first monitoring signal 101 and a second monitoring signal 102 are sent in parallel into the optical waveguide. The first Bragg grating 10 sends back a first reflected signal 101 and the second Bragg grating sends back a second reflected signal 111.

The Bragg gratings 10 and 11 reflect different wavelengths, the first monitoring signal 100 being exclusively reflected at the first Bragg grating 10 and the second monitoring signal 110 being exclusively reflected at the second Bragg grating 11. If the optical waveguide between the pump laser 3 and the second Bragg grating 11 now breaks, then no reflected monitoring signal 101 or 111 is received at the pump laser; if the optical waveguide breaks between the second Bragg grating 11 and the first Bragg grating 10, then usually only the second reflected monitoring signal 111 is received. Depending on whether the pump laser 3 receives both reflected monitoring signals 101 and 111, or receives only the second reflected monitoring signal 111 or generally no reflected monitoring signals, it can be concluded that the optical waveguide is operational, or is fractured between the pump laser 3 and the second Bragg grating 11, or between the second Bragg grating 11 and the first Bragg grating 10. Several such sections can be obtained by means of an arrangement of several Bragg gratings, thus allowing more precise location of a fracture point.

What is claimed is:

1. A method for monitoring an optical waveguide between a monitoring terminal point and a monitoring unit, comprising:

providing an optical data signal;

emitting pump light from a pump laser after amplification via an optical waveguide;

emitting or transmitting from a monitoring unit, via the optical waveguide, a monitoring signal at a specific wavelength, which differs both from the wavelength of the optical data and from the wavelength of the pump light; and selectively reflecting the monitoring signal via the optical waveguide to the monitoring unit.

2. A method according to claim 1, wherein:

to decide whether a normal cleave or a planar cleave is present, the monitoring unit transmits two monitoring signals at different wavelengths to the reflection device; and the reflection device reflects only one of the two monitoring signals.

3. A method according to claim 1, wherein:

for section-by-section location of a cleave in the optical waveguide, the monitoring unit sends one or more monitoring signals at different wavelengths to different monitoring points, each with a reflection device; and each reflection device reflects precisely one monitoring signal.

4. The method of claim 1, wherein the step of reflecting the monitoring signal includes:

providing a reflection device at the monitoring terminal point in the optical waveguide; and tuning the reflection device to reflect exactly the wavelength of the monitoring signal.

5. A monitoring system, located at the start of the monitoring path, for monitoring an optical waveguide, comprising:

transmitting means for transmitting, via the optical waveguide, a monitoring signal with a specific wavelength, which differs both from the wavelength of the optical data and from the wavelength of the pump light;

receiving means for receiving the reflected monitoring signal via the optical waveguide; and a reflection device, located at the end of the monitoring path and tuned to a reflection that is exactly the wavelength of the monitoring signal.

6. A monitoring system according to claim 5, the monitoring unit further including:

additional transmitting means for transmitting a further monitoring signal at another wavelength that is not reflected at the reflection device; and additional receiving means for receiving the further monitoring signal that is transmitted by the additional transmitting means.

7. A monitoring system according to claim 5, the monitoring unit further including:

transmitting means for transmitting two or more monitoring signals of different wavelengths; and a reflection device at each of two or more monitoring points in the optical waveguide, reflecting one of the transmitted monitoring signals.

8. A monitoring unit for monitoring an optical waveguide between a reflection device and a monitoring unit, comprising:

transmitting means for transmitting a monitoring signal with a specific wavelength;

receiving means for receiving the reflected monitoring signal; and generating means for generating a shutdown signal for a pump laser which in the absence of the reflected monitoring signal requests the disconnection of the pump light.

9. A monitoring unit according to claim 8, further including:

transmitting means for transmitting a further monitoring signal; and switching logic for establishing a cleave in the optical waveguide, and furthermore deciding whether a planar cleave or a non-planar cleave exists on the basis of the received monitoring signals.

10. A monitoring unit according to claim 8, further including:

transmitting means for transmitting two or more monitoring signals of different wavelengths; and receiving means for receiving the reflected monitoring signals; and switching logic for carrying out precise section-by-section location of the cleave in the optical waveguide on the basis of the received monitoring signals.

11. A monitoring unit according to claim 8, wherein the monitoring unit is a constituent part of a pump laser.

* * * * *